(12) United States Patent
Hara et al.

(10) Patent No.: US 6,347,608 B1
(45) Date of Patent: Feb. 19, 2002

(54) INTERNAL COMBUSTION ENGINE CONTROL APPARATUS AND METHOD

(75) Inventors: Katsuya Hara; Koichi Mizutani, both of Toyota; Yasushi Kusaka, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/597,283

(22) Filed: Jun. 19, 2000

(30) Foreign Application Priority Data

Jun. 29, 1999 (JP) ............................................. 11-183062

(51) Int. Cl.$^7$ ................................................. F02N 11/08
(52) U.S. Cl. .................................... 123/179.4; 307/10.6
(58) Field of Search ........................ 123/179.4, 198 DB, 123/198 DC; 701/112, 113; 307/10.6; 340/438, 451, 452

(56) References Cited

U.S. PATENT DOCUMENTS 4,414,937 A * 11/1983 Ueda et al. ........... 123/198 DB
5,846,164 A * 12/1998 Harada ........................ 477/205

FOREIGN PATENT DOCUMENTS

| JP | 58-30438 | 2/1983 |
| JP | A-58-35245 | 3/1983 |
| JP | 59-194050 | 11/1984 |
| JP | 10-151970 | 6/1998 |

* cited by examiner

Primary Examiner—Andrew M. Dolinar
(74) Attorney, Agent, or Firm—Oliff & Berridge PLC

(57) ABSTRACT

A vehicle equipped with a brake booster that uses the negative pressure in an intake pipe of an internal combustion engine includes an automatic stop-start apparatus that performs an automatic stop-start control of the engine while securing a sufficient brake booster negative pressure in accordance with changes in the atmospheric pressure. The apparatus detects the pressure in the brake booster. If the detected pressure exceeds a predetermined reference value during the automatically stopped state of the engine, the apparatus outputs warning information or automatically restarts the engine. The reference value is changed in accordance with the magnitude of the atmospheric pressure around the vehicle.

9 Claims, 8 Drawing Sheets

INTERNAL COMBUSTION ENGINE CONTROL APPARATUS AND METHOD

INCORPORATION BY REFERENCE

The disclosure of Japanese Patent Application No. 11-183062 filed on Jun. 29, 1999 including the specification, drawings and abstract is incorporated herein by reference in its entirety.

BACKGROUND OF THE INVENTION

1. Field of Invention

The present invention relates to a technology for automatically stopping and starting an internal combustion engine installed in a motor vehicle.

2. Description of Related Art

In order to reduce the fuel consumption of and the emissions and noise from internal combustion engines installed in motor vehicles and the like, automatic stop-start apparatus for automatically stopping the operation of a vehicle-installed internal combustion engine during a stoppage of the vehicle (e.g., during a red traffic light or the like) and automatically starting the engine when the vehicle begins to move have been pursued.

There is a widely known automotive brake mechanism that has a brake booster for boosting the brake operating force from a driving person by using a negative pressure that occurs in an intake passage of an internal combustion engine (intake pipe negative pressure).

In this brake mechanism, an intake pipe negative pressure occurring in the intake passage is constantly supplied to the brake booster when the internal combustion engine is in operation. Therefore, if a negative pressure in the brake booster is consumed for a braking operation, the amount of pressure consumed is offset by an intake pipe negative pressure from the intake passage.

When the internal combustion engine is in an automatically stopped state, no intake pipe negative pressure occurs in the intake passage, so that no negative pressure is supplied from the intake passage to the brake booster. Therefore, if an automatic engine stop-start technology is applied to a motor vehicle equipped with the above-described brake mechanism, the following problem may occur. For example, when the motor vehicle is stopped on a slope and a negative pressure in the brake booster is consumed by a braking operation, the amount of pressure consumed is not compensated for. In that case, the amount of assist force that can be produced by the brake booster decreases, and the amount of brake-operating force that needs to be provided by a driving person correspondingly increases.

Japanese Patent Application Laid-Open No. 58-35245 discloses an automatic engine stop-start apparatus for coping with the aforementioned problem. If the pressure in the brake booster exceeds a predetermined value (that is, if the degree of negative pressure in the brake booster becomes less than a predetermined value) due to a driving person's braking operation while the engine is in the automatically stopped state, the apparatus warns the driving person, or automatically starts the engine while warning the driving person, to produce an intake pipe negative pressure and supply the intake pipe negative pressure to the brake booster. In this manner, the apparatus secures a brake booster negative pressure needed to boost the brake operating force.

Since the negative pressure in the brake booster is a relative pressure between the pressure in the brake booster and the atmospheric pressure, the brake booster negative pressure changes in magnitude with changes in the atmospheric pressure even if the pressure in the brake booster remains unchanged.

The above-described automatic engine stop-start apparatus uses a fixed criterion (predetermined value) to evaluate the brake booster negative pressure, and does not take changes in the atmospheric pressure into consideration. Therefore, in the apparatus, it is difficult to accurately evaluate the degree of brake booster negative pressure when the engine is in the automatically stopped state.

More specifically, at locations where the atmospheric pressure is relatively low, for example, at high altitudes or the like, it is difficult to accurately evaluate the degree of brake booster negative pressure.

SUMMARY OF THE INVENTION

Accordingly, it is an object of the invention to provide a technology for automatically stopping and automatically starting an internal combustion engine in a vehicle equipped with a brake booster that uses the negative pressure in an intake pipe of the engine, while securing a sufficient brake booster negative pressure in accordance with changes in the atmospheric pressure.

To achieve the aforementioned and/or other objects, a control apparatus for an internal combustion engine in accordance with one aspect of the invention includes a pressure detector that detects a pressure in the brake booster, and a controller that automatically stops the internal combustion engine when a predetermined stop condition is met, and that automatically starts the internal combustion engine when a predetermined start condition is met. The controller also outputs a warning and/or performs an engine restart operation when the pressure detected by the pressure detector exceeds a reference value while the internal combustion engine is automatically stopped. The controller also can change the reference value in accordance with an atmospheric pressure.

Therefore, if the actual degree of negative pressure in the brake booster decreases during the automatically stopped state of the engine, the apparatus is able to immediately start the engine or advise a driving person to start the engine. As a result, the intake pipe negative pressure that occurs in the intake pipe of the engine is supplied to the brake booster, so that a sufficient negative pressure is reliably provided in the brake booster.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of an automatic stop-start apparatus for an internal combustion engine according to the invention will be described hereinafter with reference to the accompanying drawings.

Figure 1:
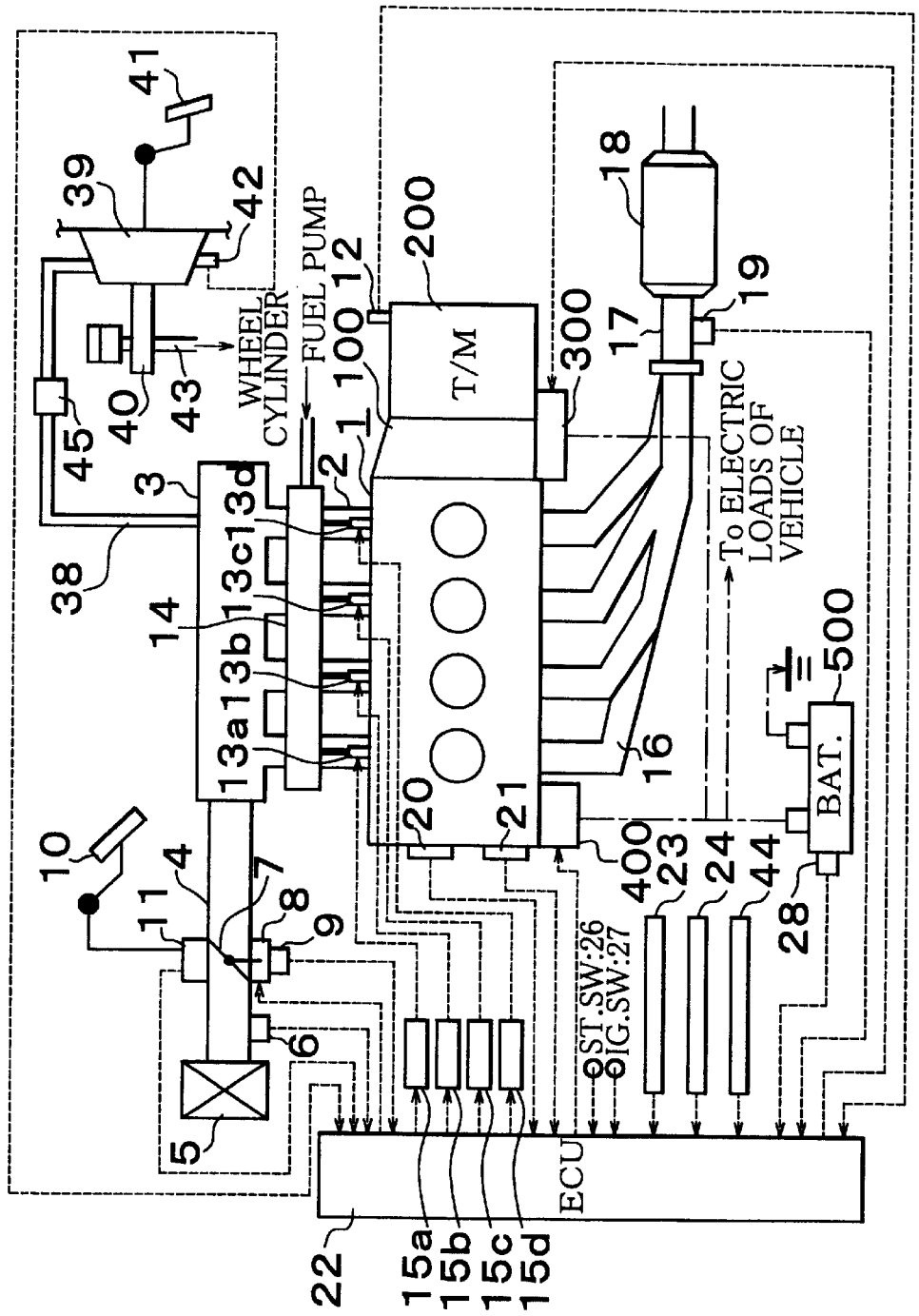
FIG. 1 is a schematic diagram of a construction of an internal combustion engine to which a first embodiment of the invention is applied.

FIG. 1 is a schematic diagram of a construction of a vehicle having an internal combustion engine to which a first embodiment of the invention is applied.

An internal combustion engine 1 shown in FIG. 1 is a water-cooled four-cylinder gasoline engine. The engine 1 is connected to a transmission (T/M) 200 via a clutch mechanism (or torque converter) 100.

The transmission 200 is connected to drive wheels via a propeller shaft, a differential gear and the like.

In the power transmission system described above, torque is transmitted from an output shaft or crankshaft (not shown) of the engine 1 to the transmission 200 via the clutch mechanism 100, when the clutch mechanism 100 is engaged. The rotating speed is reduced or increased by the transmission 200. Torque is then transmitted from the transmission 200 to the drive wheels via the propeller shaft, the differential gear and the like.

An intake manifold 2 is connected to the engine 1. Branch pipes of the intake manifold 2 communicate with combustion chambers (not shown) of corresponding cylinders via intake ports. The intake manifold 2 is connected to a surge tank 3. The surge tank 3 is connected to an air cleaner box 5 via an intake pipe 4.

A throttle valve 7 for adjusting the flow of air through the intake pipe 4 is provided in a pathway of the intake pipe 4. The throttle valve 7 is provided with an actuator 8 that is formed by a stepper motor or the like and drives the throttle valve 7 in opening and closing directions in accordance with the magnitude of current applied thereto. The throttle valve also is provided with a throttle position sensor 9 that outputs an electric signal corresponding to the extent of opening of the throttle valve 7.

The throttle valve 7 is connected to an accelerator lever (not shown) that is turned in association with an accelerator pedal 10 provided in a passenger compartment. The accelerator lever is provided with an accelerator position sensor 11 that outputs an electric signal corresponding to the amount of rotation of the accelerator lever (that is, an electric signal corresponding to the amount of depression of the accelerator pedal 11).

In the intake system constructed as described above, air drawn into the air cleaner box 5 is filtered by an air filter disposed in the air cleaner box 5 to remove dust or the like from air. After air is then led into the intake pipe 4 the rate of air flow is adjusted by the throttle valve 7 After that, air is led to the surge tank 3 and then to the intake manifold 2. Air is then distributed into the intake ports of the engine 1 via the corresponding branch pipes.

An air flow meter 6 that outputs an electric signal corresponding to the mass of air flowing through the intake pipe 4 is provided at a site in the intake pipe 4 upstream of the throttle valve 7.

A negative pressure passage 38 is connected to the surge tank 3. The negative pressure passage 38 is connected to a brake booster 39 that serves as a power source for a mechanism for braking the vehicle having the engine 1. Provided in a pathway of the negative pressure passage 38 is a one-way valve 45 that allows air to flow from the brake booster 39 toward the surge tank 3 and that prevents air from flowing from the surge tank 3 toward the brake booster 39.

The brake booster 39 is disposed between a master cylinder 40 and a brake pedal 40. The brake booster 39 is designed so as to add to the operating force on the brake pedal 41 and transmit the increased force to the master cylinder 40.

More specifically, the brake booster 39 has a diaphragm that is provided in a box so as to be easily movable in opposite directions, a pushrod that extends through the diaphragm and that is supported by a casing so as to advance and withdraw in cooperation with reciprocating movements of the diaphragm, and a return spring that urges the diaphragm in such a direction as to withdraw the pushrod backward.

Therefore, the space inside the casing of the brake booster 39 is divided into two spaces by the diaphragm. Hereinafter, the space on the pushrod advancing side of the diaphragm is termed negative pressure chamber, and the space on the pushrod withdrawing side of the diaphragm is termed atmospheric chamber.

The negative pressure chamber communicates with the negative pressure passage 38 and receives an intake pipe negative pressure that occurs in the surge tank 3.

The atmospheric chamber communicates with the negative pressure passage 38 when the diaphragm and the pushrod are held at a normal position by the force from the return spring. When the diaphragm and the pushrod are moved in the advancing direction, a communication path between the atmospheric chamber and the negative pressure passage 38 is closed, and the atmospheric chamber communicates with a predetermined atmosphere introducing passage.

The master cylinder 40 has a reservoir tank for storing brake fluid, and a pressure chamber for pressurizing brake fluid.

A master cylinder piston is disposed for easy reciprocating movements in the pressure chamber of the master cylinder 40.

A base end of the master cylinder piston is connected to a distal end of the pushrod of the brake booster 39 so that the master cylinder piston is movable back and forth in concert with reciprocating movements of the pushrod.

The pressure chamber of the master cylinder 40 communicates with wheel cylinders of brake calipers provided for individual wheels of the vehicle, via brake lines 43, so that brake fluid pressurized in the pressure chamber is delivered to the wheel cylinders.

The brake pedal 41, provided in the compartment, is connected to a base end of the pushrod of the brake booster 39 via an operating rod and the like.

In the brake system constructed as described above, the diaphragm of the brake booster 39 is urged to the normal position by the return spring when the brake pedal 41 is not operated. During the non-operated state of the brake pedal 41, the intake pipe negative pressure is delivered to both the atmospheric chamber and the negative pressure chamber, so that the pressures in the atmospheric chamber and the negative pressure chamber become equal. The diaphragm is thus held at the normal position.

When the brake pedal 41 of the braking system is operated, the operating force on the brake pedal 41 is transmitted to the pushrod of the brake booster 39 via the operating rod and the like to advance the pushrod.

When the pushrod is advanced, the negative pressure-introducing path to the atmospheric chamber of the brake booster 39 is closed, and the atmosphere introducing passage to the atmospheric chamber is opened, so that the atmospheric chamber receives the atmospheric pressure. Since the intake pipe negative pressure continues to be delivered to the negative pressure chamber of the brake booster 39, the pressure in the atmospheric chamber becomes higher than the pressure in the negative pressure chamber, thereby generating a force that moves the diaphragm in the pushrod advancing direction (hereinafter, referred to as "assist force"). The assist force acts on the pushrod via the diaphragm.

As a result, the pushrod is advanced by the operating force from the brake pedal 41 combined with the assist force generated by the brake booster 39. The thus-boosted operating force is transmitted from the pushrod to the master cylinder piston of the master cylinder 40 to pressurize brake fluid in the pressure chamber.

The pressure of brake fluid pressurized in the pressure chamber of the master cylinder 40 is delivered to the wheel cylinders via the brake lines 43.

The brake booster 39 is provided with a brake booster pressure sensor 42 that outputs an electric signal corresponding to the pressure in the negative pressure chamber.

Fuel injection valves 13*a*, 13*b*, 13*c*, 13*d* (hereinafter, collectively referred to as "fuel injection valves 13") are disposed in the branch pipes of the intake manifold 2 so that an inject-on port of each fuel injection valve 13 faces the corresponding intake port. The fuel injection valves 13 are connected to a fuel distribution pipe 14 that is connected to a fuel pump (not shown).

The fuel injection valves 13 are connected to drive circuits 15*a*, 15*b*, 15*c*, 15*d* (hereinafter, collectively referred to as "drive circuits 15 "), whereby the corresponding fuel injection valves 13 are opened.

In the fuel injection system constructed as described above, fuel ejected from the Fuel pump is supplied to the fuel distribution pipe 14. Fuel is then distributed from the fuel distribution pipe 14 to each fuel injection valve 13. When a drive circuit 15 applies a drive current to the corresponding fuel injection valve 13 the fuel injection valve 13 opens to inject fuel supplied from the fuel distribution pipe 14, into the corresponding intake port. After being injected into the intake port, fuel is supplied into the corresponding combustion chamber of the engine 1 while mixing with air flowing from the intake manifold 2 into the intake port.

An exhaust manifold 16 is connected to the engine 1. Branch pipes of the exhaust manifold 16 are connected to exhaust ports of the combustion chambers of the corresponding cylinders. The exhaust manifold 16 is connected to an exhaust pipe 17 that is connected at a downstream end thereof to a muffler (not shown).

Provided in a pathway of the exhaust pipe 17 is an exhaust gas control catalyst device 18 for substantially removing harmful gas components, such as carbon monoxide (CO), oxides of nitrogen (NOx), hydrocarbons (HC) and the like, from exhaust gas discharged from the engine 1. The exhaust gas control catalyst device 18 may be formed by a three-way catalyst, an oxidizing catalyst, a selective reducing NOx catalyst, an absorbing-reducing NOx catalyst, or the like.

In the exhaust system constructed as described above, exhaust gas is discharged from the combustion chambers of the engine 1 into the exhaust ports after air-fuel mixture is burned in the combustion chambers. After being discharged into the exhaust ports, exhaust gas is led from the exhaust ports through the branch pipes, and then is led from the exhaust manifold 16 into the exhaust pipe 17.

After being introduced into the exhaust pipe 17, exhaust gas is introduced into the exhaust gas control catalyst device 18, whereby harmful gas components are substantially removed from the exhaust gas. After that, exhaust gas is emitted from the muffler into the atmosphere.

An air-fuel ratio sensor 19 is provided at a site in the exhaust pipe 17 upstream of the exhaust gas control catalyst device 18. The air-fuel ratio sensor 19 outputs an electric signal corresponding to the air-fuel ratio of exhaust gas flowing through the exhaust pipe 17.

The engine 1 also has a power generator mechanism 400 that is connected to a crank pulley (not shown) mounted on a base end of the crankshaft via a belt (not shown). The power generator mechanism 400 is formed by, for example, an alternator, a regulator, a controller, and the like.

The engine 1 is also provided with a crank position sensor 20 that outputs a pulse signal every time the crankshaft (not shown) turns a predetermined angle (e.g., 10 degrees), and a water temperature sensor 21 that outputs an electric signal corresponding to the temperature of cooling water that flows in a water jacket formed in the engine 1.

The engine 1 or the clutch mechanism 10 is provided with a starter motor 300 having a pinion gear that meshes with a ring gear provided on a circumferential portion of a flywheel or drive wheel (not shown) that is connected to a distal end of the crankshaft.

The starter motor 300 is provided with a battery 500 for supplying drive power to the starter motor 300, and a starter switch (ST.SW) 26 for changing between the supply of drive power to the starter motor 300 and the discontinuation of the power supply.

When the starter switch 26 is switched from an OFF state to an ON state by a driving person's operation, drive current is supplied from the battery 500 to the starter motor 300, so that a rotating shaft of the starter motor 300 turns.

The torque of the rotating shaft of the starter motor 300 is transmitted to the crankshaft via the pinion gear and the flywheel, so that the cranking of the engine 1 is performed.

The transmission (T/M) 200 is provided with a pickup type rotational speed sensor 12 that outputs a pulse signal every time an output shaft (not shown) of the transmission 200 turns a predetermined angle.

The engine 1 constructed as described above is provided with an electronic control unit (ECU) 22 for controlling the engine 1.

Input ports of the ECU 22 are connected, via electric wiring, to the air flow meter 6, the throttle position sensor 9, the accelerator position sensor 11, the rotational speed sensor 12, the air-fuel ratio sensor 19, the crank position sensor 20, the water temperature sensor 21, the starter switch 26 and the power generator mechanism 400 and, furthermore, to a shift position sensor 23 that detects the position of a shift lever disposed in the compartment, a brake switch 24 that detects the operated/non-operated states of the brake pedal, an ignition switch (IG.SW) 27 that is operated by a driving person, an SOC controller 28 that calculates a state of charge of the battery 500 from an integrated value of the amount of current discharged from and the amount of current charged into the battery 500, an atmospheric pressure sensor 44 that outputs an electric signal corresponding to the atmospheric pressure, and the like. Thus, the output signals of the various sensors and the like are input to the ECU 22.

Output ports of the ECU 22 are connected to the actuator 8, the drive circuits 15, the starter motor 300, the power generator mechanism 400, and the like, via electric wiring. Using the signals from the various sensors as parameters, the ECU 22 is able to send control signals to the actuator 8, the drive circuits 15, the starter motor 300, the power generator mechanism 400, and the like.

Figure 2:
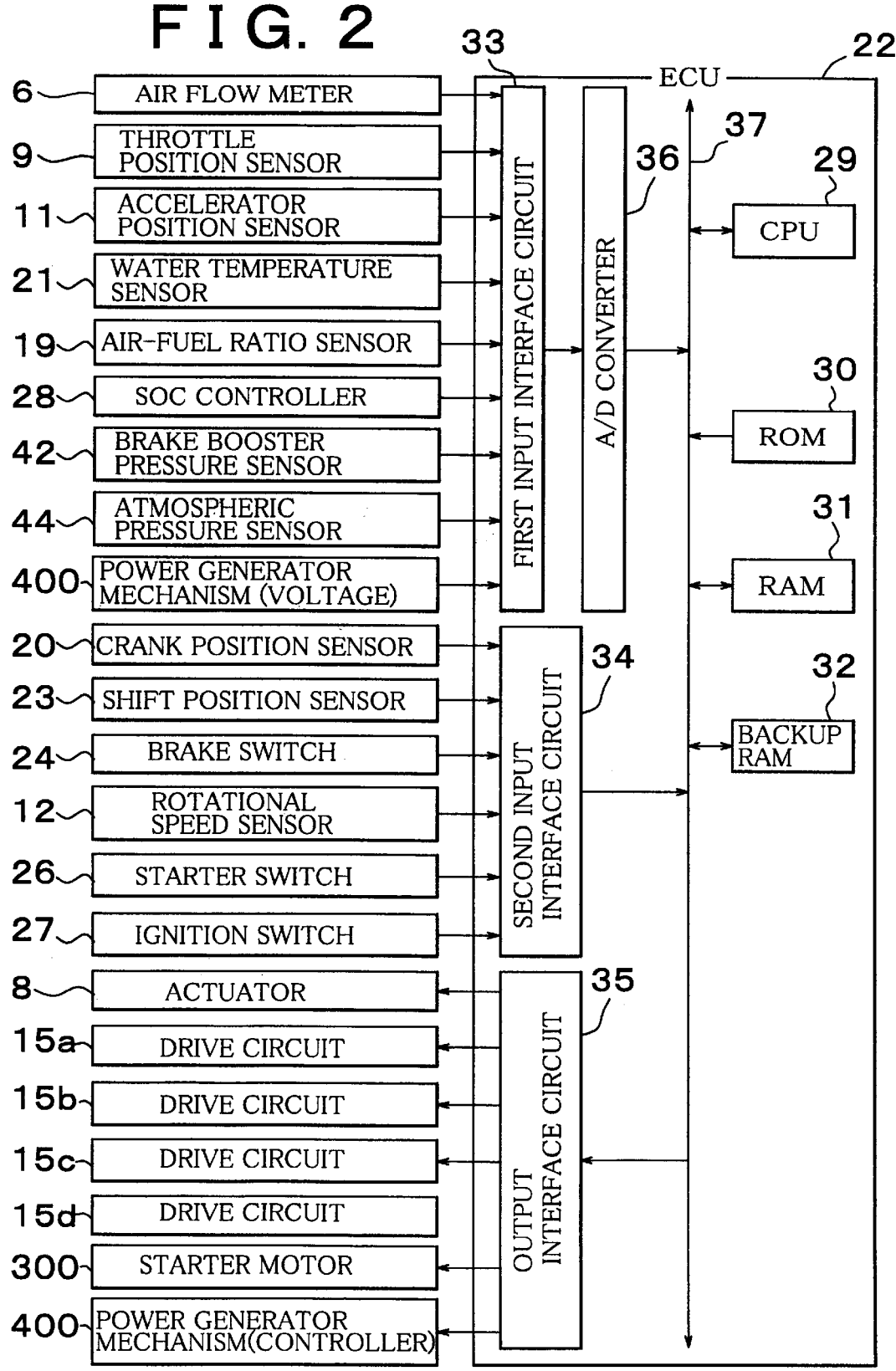
FIG. 2 is a diagram of an internal construction of an ECU.

As shown in FIG. 2, the ECU 22 has a CPU 29, a ROM 30, a RAM 31 and a backup RAM 32, that are interconnected by a bidirectional bus 37. The bidirectional bus 37 is also connected to a first input interface circuit 33 via an A/D converter 36, and is also connected to a second input interface circuit 34 and an output interface circuit 35.

The first input interface circuit 33 is connected to the air flow meter 6, the throttle position sensor 9, the accelerator position sensor 11, the air-fuel ratio sensor 19, the water temperature sensor 21, the SOC controller 28, the brake booster pressure sensor 42, the atmospheric pressure sensor 44, and the power generator mechanism 400, via electric wiring. The first input interface circuit 33 receives the output signals of the sensors, voltage generated by the power generator mechanism 400, and the like, and inputs the signals, the voltage and the like to the A/D converter 36.

The A/D converter 36 converts the various signal inputs from the first input interface circuit 33 from analog forms into digital forms, and then sends the signals to the CPU 29 or to the RAM 31 via the bidirectional bus 37.

The second input interface circuit 34 is connected to the rotational speed sensor 12, the crank position sensor 20, the shift position sensor 23, the brake switch 24, the starter switch 26, and the ignition switch 27, via electric wiring. The second input interface circuit 34 inputs the signals from the various sensors and the like, and sends the signals to the CPU 29 or to the RAM 31 via the bidirectional bus 37.

The output interface circuit 35 is connected to the actuator 8, the drive circuits 15, the starter motor 300, and a controller of the power generator mechanism 400, via electric wiring. The output: interface circuit 35 sends various control signals from the CPU 29 to the actuator 8, the drive circuits 15, the starter motor 300, or the controller of the power generator mechanism 400.

The ROM 30 stores various application programs of a fuel injection amount control routine for determining an amount of fuel to be injected from each fuel injection valve 13 a fuel injection timing control routine for determining a timing of injecting fuel from each fuel injection valve 13 an ignition timing control routine for determining an ignition timing of each cylinder, a throttle opening amount control routine for determining an extent of opening of the throttle valve 7, and the like, and various control maps.

Examples of the control maps stored in the ROM 30 include a fuel injection control map that indicates a relationship between the operation state of the engine 1 and the fuel injection amount, a fuel injection timing control map that indicates a relationship between the operation state of the engine 1 and the fuel injection timing, an ignition timing control map that indicates a relationship between the operation state of the engine 1 and the ignition timing, and the like.

The RAM 31 stores signals from the various sensors, results of computations by the CPU 29, and the like. The results of computations include, for example, an engine revolution speed calculated based on the output signal of the crank position sensor 20, a vehicle traveling speed (vehicle speed) or a vehicle travel distance calculated based on the output signal of the rotational speed sensor 12, and the like. The signals from the various sensors, the results of computations by the CPU 29, and the like are updated to the latest data every time the crank position sensor 20 outputs a pulse signal.

The backup RAM 32, is a non-volatile memory that retains data even after the engine 1 is stopped.

The CPU 29 operates in accordance with the application programs stored in the ROM 30. Using the signals from the various sensors, the CPU 29 executes the fuel injection control, the ignition control, the throttle control, and the like, and also executes an automatic stop-start control, which is a main focus of the invention.

The automatic stop-start control according to this embodiment will be described below.

Figure 3:
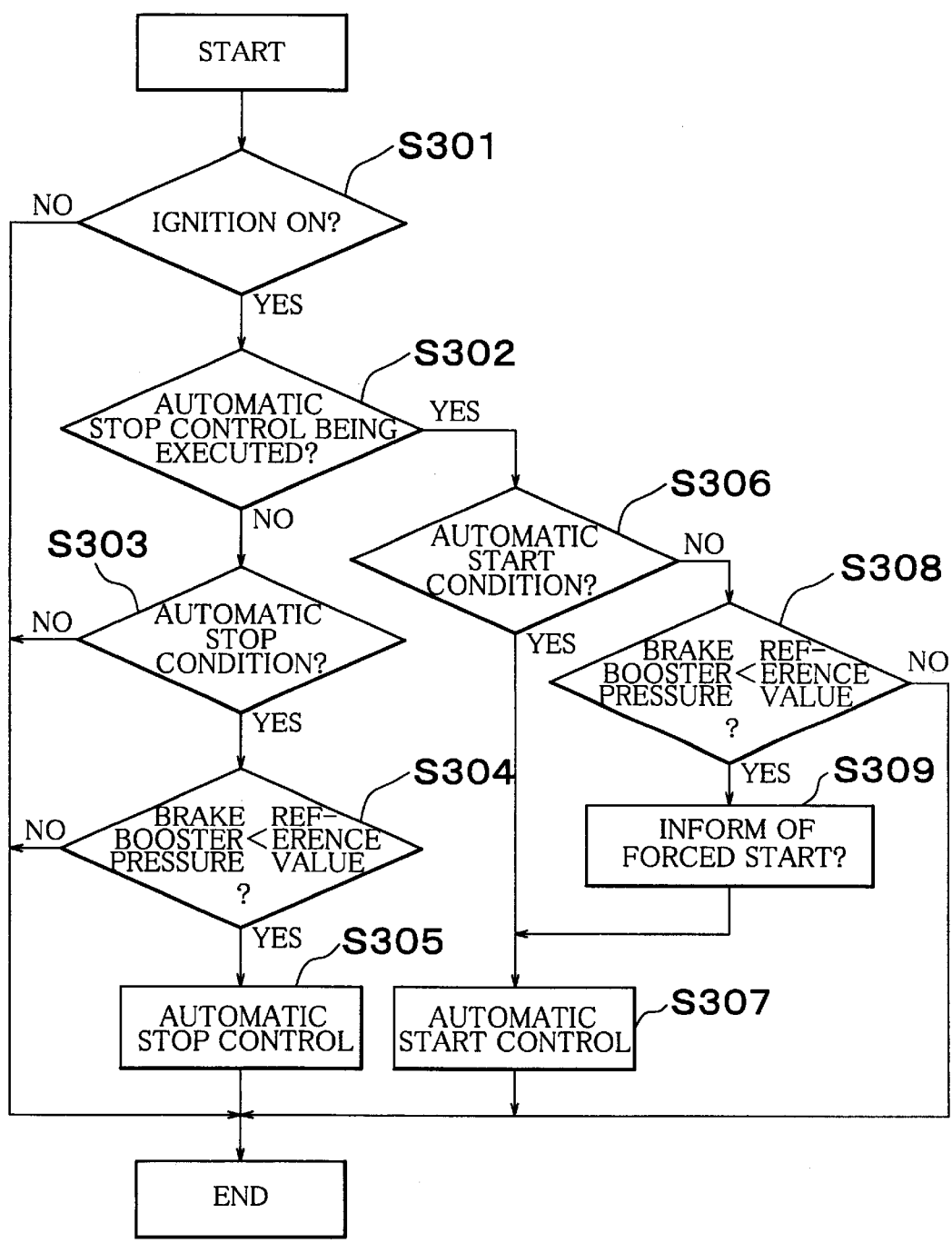
FIG. 3 is a flowchart illustrating an automatic stop-start control routine.

To perform the automatic stop-start control, the CPU 29 executes an automatic stop-start control routine as illustrated in FIG. 3. The automatic stop-start control routine is repeatedly executed at every predetermined time interval when the ignition switch 27 is in the ON state.

In the automatic stop-start control routine, the CPU 29 first determines in S301 whether the ignition switch 27 is in the ON state.

If it is determined in S301 that the ignition switch 27 is in the OFF state, the CPU 29 ends the execution of the routine.

If the determination in S301 is affirmative (YES), the CPU 29 proceeds to S302, in which the CPU 29 determines whether the automatic stop-start control is being performed, that is, whether the engine 1 is in the automatically stopped state.

If the determination in S302 is negative (NO), the process proceeds to S303, in which the CPU 29 determines whether a condition for automatically stopping the engine 1 is met.

The automatic stop condition includes, for example:
a condition that the vehicle traveling speed is zero;
a condition that the value of the output signal of the shift position sensor 23 indicates a NEUTRAL position;
a condition that the engine revolution speed calculated based on the value of the output signal of the crank position sensor 20 is less than or equal to a predetermined revolution speed; and
a condition that the value of the output signal of the accelerator position sensor 11 indicates that the amount of depression of the accelerator pedal 10 is zero.

If the determination in S303 is NO, the CPU 29 temporarily ends the execution of the routine.

If the determination in S303 is YES, the process proceeds to S304, in which the CPU 29 reads a reference value (that is determined by a different routine of setting a reference value) from the backup RAM 32, or from the RAM 31, and inputs the output signal of the brake booster pressure sensor 42 (brake booster pressure), and compares the brake booster pressure with the reference value.

The reference value is set as an upper limit value of the pressure that is needed for the brake booster 39 to produce a desired assist force, for the following reason. The negative pressure in the brake booster 39 is a relative pressure of the pressure (absolute pressure) in the negative pressure chamber of the brake booster 39 relative to the atmospheric pressure. Therefore, if the pressure in the negative pressure chamber becomes higher than a predetermined pressure, the pressure therein relative to the atmospheric pressure decreases and makes it impossible for the brake booster 39 to produce a desired assist force.

It is preferable that the reference value be variable in accordance with the atmospheric pressure occurring at the location where the vehicle travels.

The brake booster pressure sensor 42 is a sensor for detecting the absolute pressure in the negative pressure chamber of the brake booster 39, and the degree of negative pressure in the negative pressure chamber is determined by a relative pressure based on the output signal of the brake booster pressure sensor 42 and the atmospheric pressure. Therefore, if the reference value is a fixed value, a problem is likely to occur at locations where the atmospheric pressure is relatively low, for example, at high altitudes. That is, at such a location, the pressure in the negative pressure chamber may be less than the reference value even though pressure in the negative pressure chamber relative to the atmospheric pressure is actually lower than an allowable range.

Figure 4:
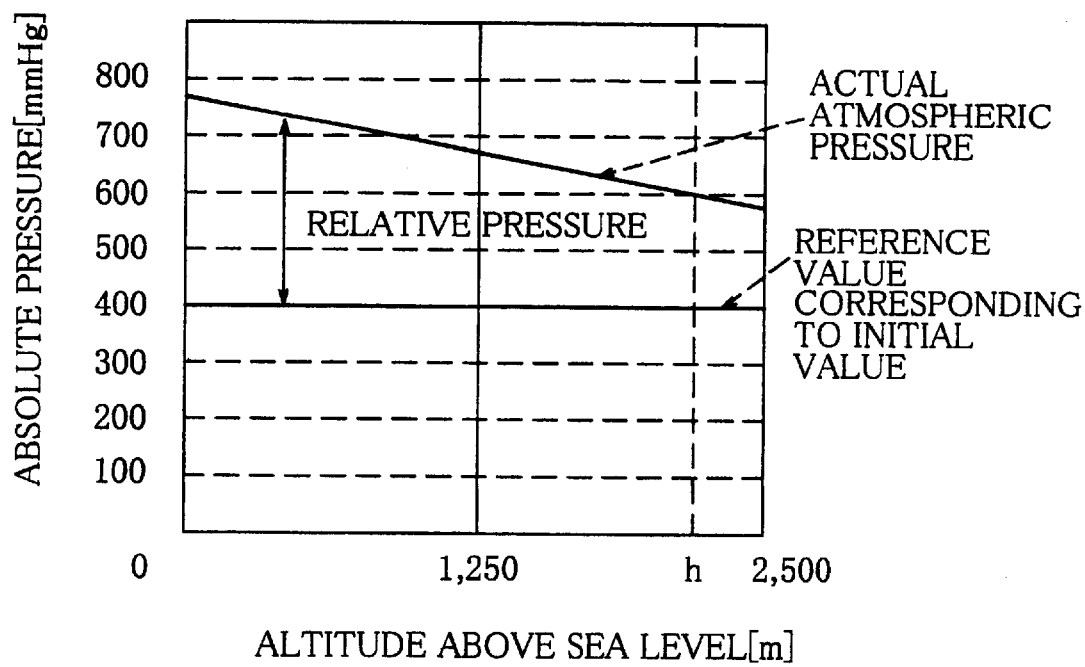
FIG. 4 is a diagram for illustration of a related-art method for setting a reference value used for determining a brake booster negative pressure.

FIG. 4 indicates an example case where the reference value is fixed at about 400 mHg. At 0 m of altitude above sea level, the atmospheric pressure is about 760 mmHg, and the relative pressure based on the reference value and the atmospheric pressure becomes higher than 300 mmHg. Therefore, as long as the pressure in the negative pressure chamber is less than the reference value, the brake booster 39 is allowed to produce a sufficient assist force.

Above h [m] (indicated by the broken vertical line in FIG. 4) of altitude above sea level, the atmospheric pressure is less than 600 mmHg, and the relative pressure based on the reference value and the atmospheric pressure becomes less than 200 mmHg. Therefore, there is a danger that the brake booster 39 may become unable to produce a sufficient assist force even though the pressure in the negative pressure chamber is lower than the reference value.

In this embodiment, however, the reference value used to evaluate the degree of negative pressure in the brake booster 39 is corrected based on the actual atmospheric pressure occurring at a location where the vehicle travels, so as to improve the determination precision.

Figure 5:
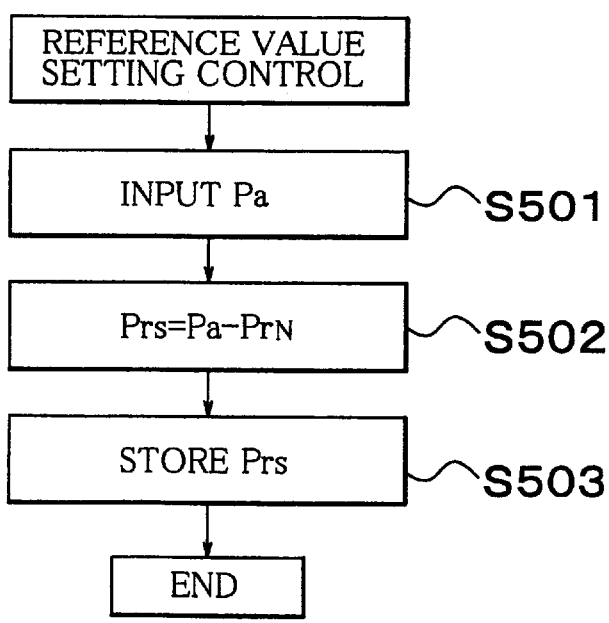
FIG. 5 is a flowchart illustrating a reference value setting control routine.

More specifically, the CPU 29 sets a reference value through a reference value setting control routine as illustrated in FIG. 5. The reference value setting control routine is pre-stored in the ROM 30 or the like, and is executed repeatedly at every predetermined time interval when the ignition switch 27 is in the ON state.

In this routine, the CPU 29 first inputs the output signal of the atmospheric pressure sensor 44 (atmospheric pressure Pa) in S501.

In S502, the CPU 29 calculates a reference value Prs by subtracting a negative pressure PrN needed for the brake booster 39 to produce a minimum required assist force, from the atmospheric pressure Pa input in S501.

In S503, the CPU 29 stores the reference value Prs calculated in S502 into a predetermined area of the RAM 31 or of the backup RAM 32. The CPU 29 then ends the execution of the FIG. 5 routine.

Figure 6:
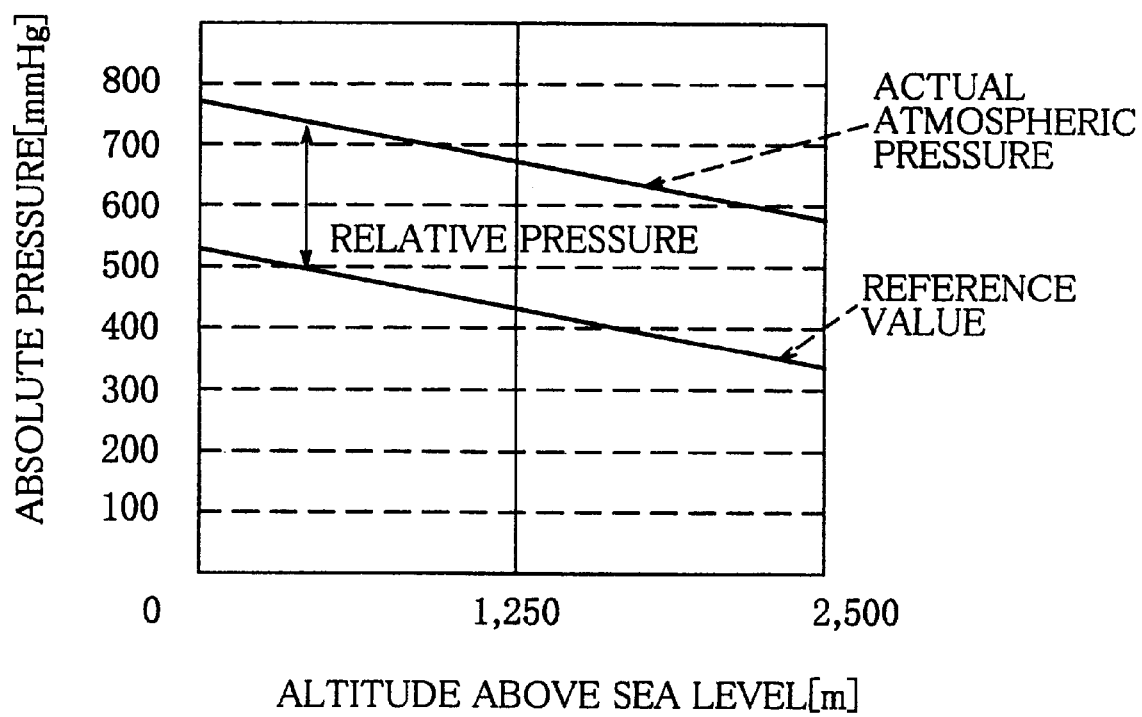
FIG. 6 is a diagram for illustration of a method for setting a reference value used for determining a brake booster negative pressure according to the first embodiment.

Due to the reference value setting control routine, the reference value is set taking the actual magnitude of atmospheric pressure into consideration, as indicated in FIG. 6. As a result, it becomes possible for the brake booster 39 to produce a minimum required assist force at any altitude above sea level as long as the pressure in the 25, negative pressure chamber of the brake booster 39 is less than the reference value.

Referring back to the automatic stop-start control routine in FIG. 3, if it is determined in S304 that the value of the output signal of the brake booster pressure sensor 42 (brake booster pressure) is less than the reference value, it is considered that a negative pressure needed for the brake booster 39 to produce a minimum required assist force is already provided in the negative pressure chamber of the brake booster 39 and, therefore, the operation of the engine 1 does not need to be continued in order to supply the intake pipe negative pressure into the negative pressure chamber. Then, the CPU 29 proceeds to S305.

In S305, the CPU 29 executes the automatic stop control of the engine 1. In the automatic stop control, the CPU 29 stops the operation of the engine 1 by, for example, discontinuing the supply of the drive power from the drive circuits 15 to the fuel injection valves 13 (generally termed fuel cut control) and/or controlling the throttle valve actuator 8 so as to completely close the throttle valve 7.

After executing the processing of S305, the CPU 29 temporarily ends the execution of the routine.

Conversely, if it is determined in S304 that the value of the output signal of the brake booster pressure sensor 42 (brake boost pressure) is greater than or equal to the reference value, it is considered that the negative pressure needed for the brake booster 39 to produce the minimum required assist force is not provided in the negative pressure chamber of the brake booster 39 and, therefore, the operation of the engine 1 needs to be continued in order to supply the intake pipe negative pressure into the negative pressure chamber. Then, the CPU 29 temporarily ends the execution of the routine (i.e., without executing the automatic stop control).

If it is determined in S302 that the engine 1 is in the automatically stopped state, the process proceeds to S306, in which the CPU 29 determines whether a condition for automatically starting the engine 1 is met.

The automatic start condition includes, for example:
a condition that the value of the output signal of the shift position sensor 23 indicates the NEUTRAL position;
a condition that the engine revolution speed calculated based on the value of the output signal of the crank position sensor 20 is 0 rpm; and
a condition that a clutch pedal is depressed and the clutch is disengaged.

If it is determined in S306 that the condition for automatically starting the engine 1 is met, the process proceeds to S307, in which the CPU 29 executes the control of automatically starting the engine 1. Then, the CPU 29 temporarily ends the execution of the routine.

In the automatic start control, the CPU 29 executes, for example, the activation of the starter motor 300, the activation of the fuel injection valves 13 and the activation of ignition plugs (not shown).

If it is determined in S306 that the condition for automatically starting the engine 1 is not met, the process proceeds to S308. In S308, the CPU 29 reads the reference value from the RAM 31 or from the backup RAM 32, and inputs the value of the output signal of the brake booster pressure sensor 42 (brake booster pressure), and compares the brake booster pressure with the reference value as in S304.

If it is determined in S308 that the brake booster pressure is less than the reference value, it is considered that the negative pressure needed for the brake booster 39 to produce the minimum required assist force is already provided in the negative pressure chamber of the brake booster 39 and, therefore, the engine 1 does not need to be started in order to supply the intake pipe negative pressure into the negative pressure chamber. The CPU 29 then temporarily ends the execution of the routine.

Conversely, if it is determined in S308 that the brake booster pressure is greater than or equal to the reference value, it is considered that the negative pressure needed for the brake booster 39 to produce the minimum required assist force is not provided in the negative pressure chamber of the brake booster 39 and, therefore, the engine 1 needs to be started in order to supply the intake pipe negative pressure into the negative pressure chamber. Then, the CPU 29 proceeds to S309.

In S309, the CPU 29 informs a driving person that the engine 1 will be forcibly started. More specifically, the CPU 29 informs a driving person that the engine 1 is to be forcibly started, by, for example, turning on a warning light provided in the passenger compartment, or by producing a warning sound from a speaker provided in the compartment, or by displaying a message on a display device provided in the compartment, or by producing an announcement from a speaker provided in the compartment, or the like.

After executing the processing of S309, the CPU 29 proceeds to S307, in which the CPU 29 executes the control of automatically starting the engine 1 in order to forcibly start the engine 1 as described above.

Due to the restart of the engine 1, an intake pipe negative pressure occurs in the surge tank 3 and is supplied to the negative pressure chamber of the brake booster 39 via the negative pressure passage 38 so that the degree of negative pressure in the negative pressure chamber of the brake booster 39 increases.

Thus, in this embodiment, the reference value used to evaluate the degree of negative pressure in the brake booster 39 is set based on the actual atmospheric pressure. As a result, it becomes possible to accurately evaluate the degree of negative pressure in the brake booster 39 even in a situation where the atmospheric pressure fluctuates.

Therefore, when the negative pressure in the brake booster 39 becomes insufficient during the automatically stopped state of the engine 1, the engine 1 is immediately started automatically to supply the brake booster 39 with the intake pipe negative pressure that occurs in the surge tank 3. In this manner, the embodiment is able to reliably provide a negative pressure that is needed for the brake booster 39 to boost the brake operating force.

In the foregoing embodiment, a dedicated sensor for detecting the atmospheric pressure (atmospheric pressure sensor) is employed since the internal combustion engine to which the invention is applied is represented by a mass flow-type internal combustion engine equipped with an air flow meter or a similar sensor for directly detecting an amount of intake air in the foregoing embodiment. However, if the invention is applied to a speed density-type internal combustion engine wherein an amount of intake air is estimated from the intake pipe pressure and the engine revolution speed, the atmospheric pressure may be detected by using a sensor that detects the intake pipe pressure, instead of using the dedicated atmospheric pressure sensor.

In that case, the atmospheric pressure may be determined based on a signal output from the intake pipe pressure sensor immediately before the engine is started (for example, when the ignition switch is on and the starter switch is off), or a signal output from the intake pipe pressure sensor when the engine is in a steady state.

A second embodiment of an automatic stop-start apparatus for an internal combustion engine according to the invention will be described below. Constructions and portions that distinguish the second embodiment from the first embodiment will be described below, and constructions and portions substantially the same as those of the first embodiment will not be described again.

Whereas the first embodiment evaluates the degree of negative pressure in the brake booster 39 based on the atmospheric pressure detected directly by the atmospheric pressure sensor, the second embodiment evaluates the degree of negative pressure in the brake booster 39 based on an estimated atmospheric pressure.

Figure 7:
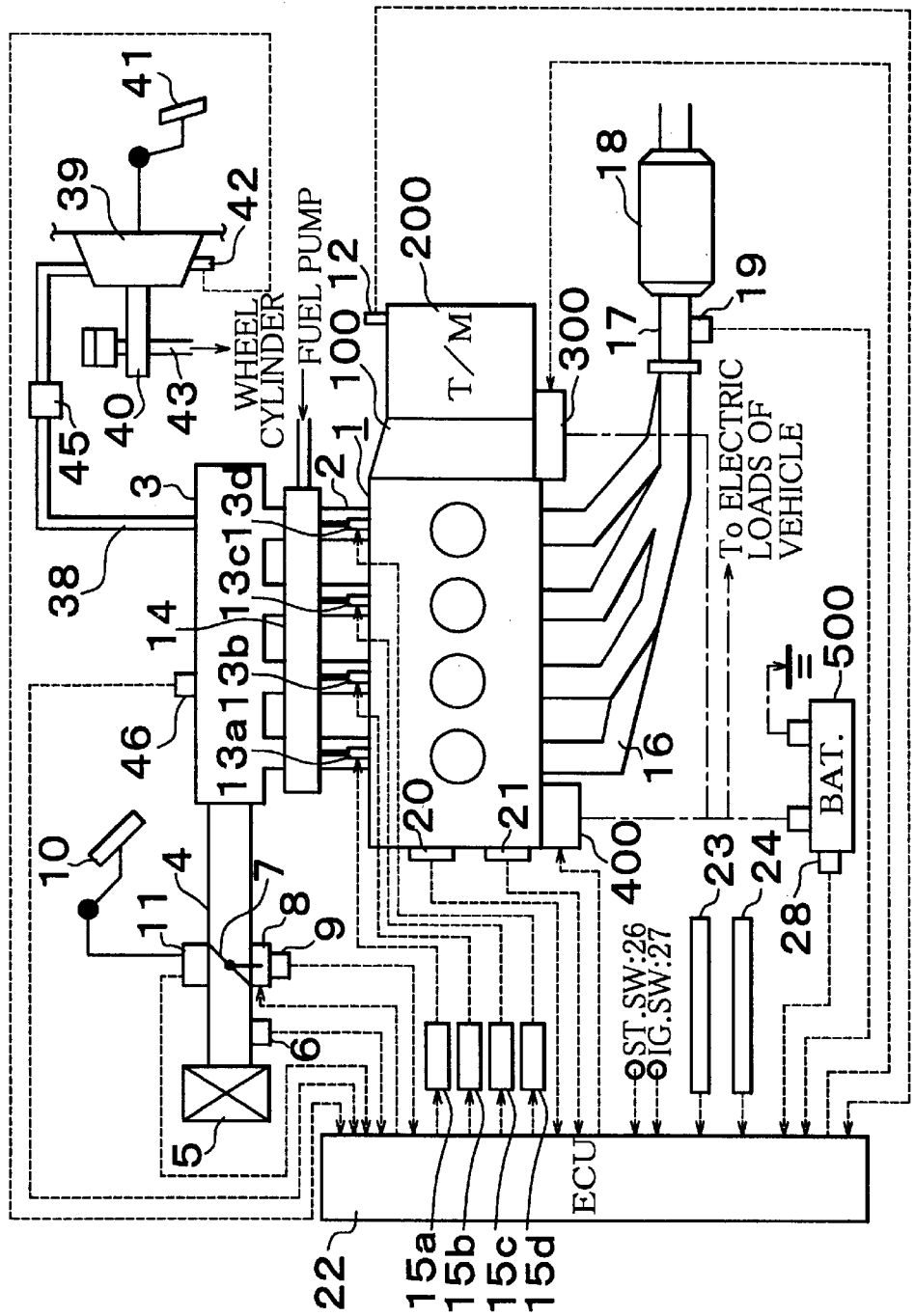
FIG. 7 is a schematic diagram of a construction of an internal combustion engine to which an automatic stop-start apparatus according to a second embodiment of the invention is applied.

FIG. 7 is a schematic diagram of a construction of an internal combustion engine 1 to which an automatic stop-start apparatus according to the second embodiment is applied. A surge tank 3 is provided with an intake air temperature sensor 46 that outputs an electric signal corresponding to the temperature of intake air flowing through the surge tank 3 (atmospheric temperature).

Figure 8:
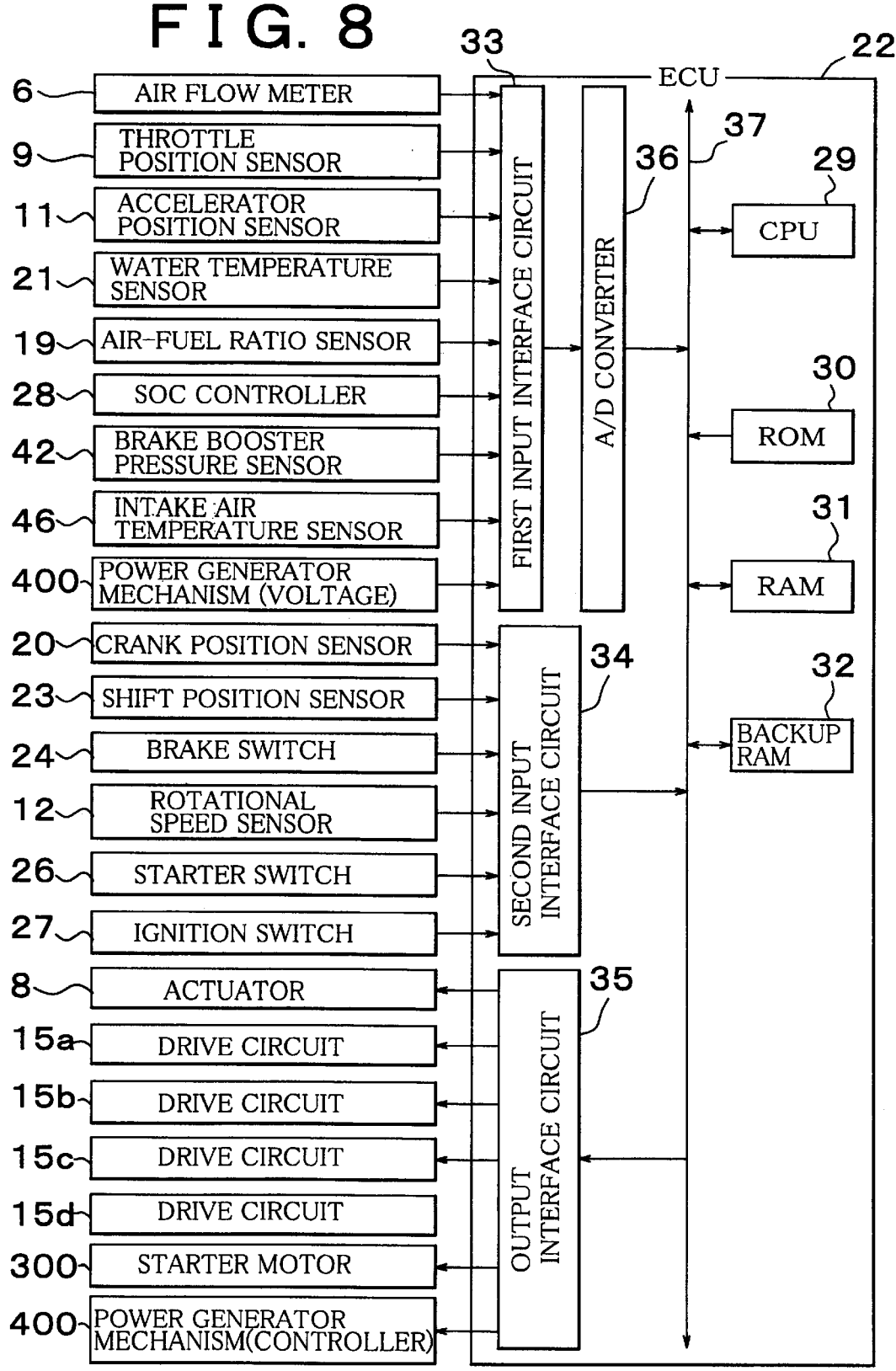
FIG. 8 is a diagram of an internal construction of an ECU.

As indicated in FIG. 8, the output signal of the intake air temperature sensor 46 is input to a CPU 29 or to a RAM 31 of an ECU 22 via a first input interface circuit 33 and an A/D converter 36.

Pre-stored in a ROM 30 of the ECU 22 is a charging efficiency control map that indicates a relationship among the throttle opening amount TA, the engine revolution speed Ne and the mass of intake air per revolution of the engine 1 GNo occurring in a condition where the atmosphere (atmospheric pressure and the atmospheric temperature) is in a predetermined standard state (e.g., atmospheric pressure Po=99 kPa, atmospheric temperature To=298K). The charging efficiency control map is empirically determined.

The CPU 29 of the ECU 22 estimates an actual atmospheric pressure Pa based on the charging efficiency control map and the output signals of various sensors including the intake air temperature sensor 46, and corrects the fuel injection amount based on the estimated atmospheric pressure Pa.

An example of a specific method for estimating an atmospheric pressure will be described below.

The CPU 29 first reads from the RAM 31 the value of the output signal of the air flow meter 6 (mass of intake air) Ga, the engine revolution speed Ne, the value of the output signal of the throttle position sensor 9 (throttle opening amount) TA, and the output signal (atmospheric temperature) Ta of the atmospheric pressure sensor 44.

Subsequently, the CPU 29 calculates a mass of intake air per revolution of the engine 1 GNa by dividing the mass of the intake air Ga by the engine revolution speed Ne. The CPU 29 also calculates a mass of intake air per revolution of the engine 1 GNo corresponding to the standard state of the atmosphere and the throttle opening amount TA and the engine revolution speed Ne, by using the throttle opening amount TA and the engine revolution speed Ne as parameters and accessing the charging efficiency control map stored in the ROM 30.

The mass of intake air per revolution of the engine 1 GNa can be expressed as in equation (1).

$$GNa = Va \times K \times (Pa/Ta)$$

where:
Va=volume of atmospheric air actually taken into the engine 1 per revolution;
K=constant
Pa=pressure of atmospheric air actually taken into the engine 1;

Ta=temperature of atmospheric air actually taken into the engine 1;

Vs=total piston displacement of the engine 1; and

ηv=as volumetric efficiency of the engine 1.

The mass of intake air per revolution of the engine 1 GNo corresponding to the standard state of the atmosphere can be expressed as in equation (2).

$$GNo = Vao \times K \times (Po/Tc) = Vs \times \eta v \times K \times (Po/To) \quad (2)$$

where:

Vao=volume of atmospheric air actually taken into the engine 1 per revolution;

K=constant

Po=pressure of atmospheric air actually taken into the engine 1;

To=temperature of atmospheric air actually taken into the engine 1;

Vs=total piston displacement of the engine 1;

ηv=volumetric efficiency of the engine 1.

Under a condition that the throttle opening amount TA and the engine revolution speed Ne remain the same, the volumetric efficiency ηv remains constant regardless of the magnitude of the atmospheric pressure, so that the actual atmospheric pressure Pa can be determined as in equation (3) based on equations (1) and (2).

$$Pa = (GNa \times Po \times Ta)/(GNo \times To) \quad (3)$$

The atmospheric pressure Pa is stored into a predetermined area of the RAM 31 or of the backup RAM 32, and is updated by a learning control.

The above-described method makes it possible to minimize the error of the estimated value of atmospheric pressure from the actual atmospheric pressure.

Subsequently, in order to evaluate the degree of negative pressure occurring in the brake booster 39 during the automatic stop-start control of the engine 1 and, in particular, during the automatically stopped state of the engine 1, the CPU 29 reads the atmospheric pressure Pa estimated by the above-described method from the RAM 31 or the backup RAM 32. Then, the CPU 29 evaluates the degree of negative pressure in the brake booster 39 in a procedure substantially the same as that in the first embodiment.

According to the fuel injection control of the engine, if the power supply to the ECU 22 is discontinued due to disconnection of a battery or the like, the learned value of atmospheric pressure stored in the RAM 31 or the backup RAM 32, is cleared. In that case, an initial value pre-stored in the ROM 30 is used as a basis to restart the fuel injection control. However, if the initial value of atmospheric pressure pre-stored in the ROM 30 is immediately used, without any modification, in the automatic stop-start control, drawbacks as stated below may occur.

Figure 9:
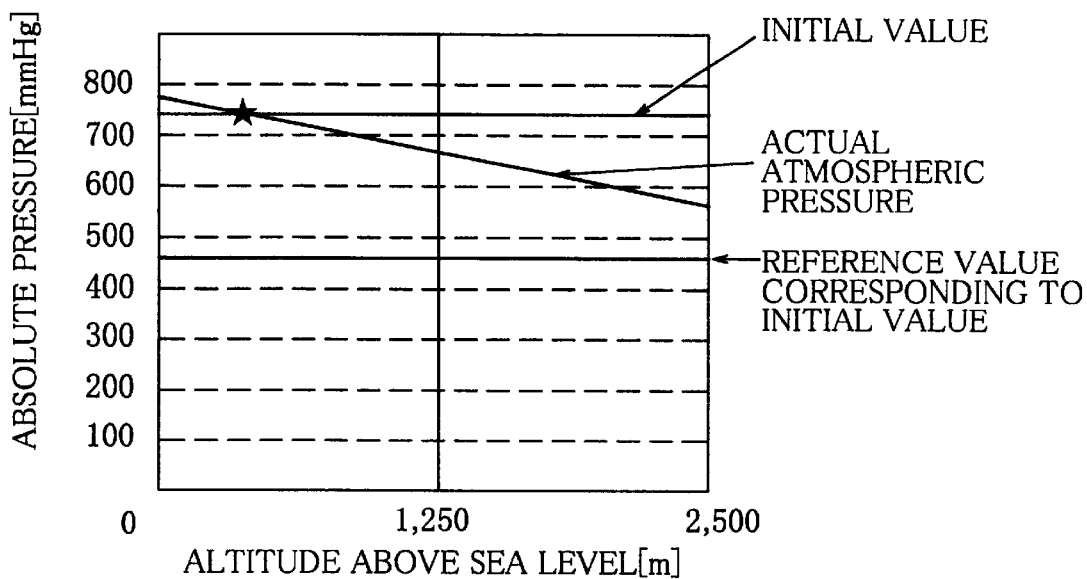
FIG. 9 is a diagram indicating a brake booster negative pressure determining reference value in a case where the initial value of a learned atmospheric pressure value is set to a value corresponding to a relatively low altitude above sea level.

For example, if an initial value of the learned atmospheric pressure value is pre-set for the fuel injection control assuming a relatively low altitude above sea level (a location where the atmospheric pressure is relatively high), and is used in the automatic stop-start control, the reference value for evaluating the degree of negative pressure in the brake booster 39 is set as a value corresponding to an atmospheric pressure at a low altitude above sea level as indicated in FIG. 9. Therefore, when the vehicle is at a high altitude above sea level, there is danger of false evaluation of the degree of negative pressure in the brake booster 39.

Therefore, in a case where the learned value of atmospheric pressure calculated in the fuel injection control or the like is used in the automatic stop-start control, it is preferable that a storage medium (e.g., EEPROM) that is freely readable-programmable and capable of retaining the stored content even after discontinuation of the power supply thereto (e.g., a non-volatile memory) be provided in the ECU 22 and that the learned value of atmospheric pressure calculated in the fuel injection control be stored into the storage medium. If the learned value of atmospheric pressure provided in the fuel injection control is set as an initial value, it is preferable that the learned value of atmospheric pressure stored in the storage medium be used to perform the automatic stop-start control.

In a case where an initial value dedicated to the automatic stop-start control is pre-set separately from an initial value for the fuel injection control and where the learned value of atmospheric pressure for the fuel injection control is reset to the initial value due to disconnection of the battery or the like, the initial value dedicated to the automatic stop-start control may be used to evaluate the degree of negative pressure in the brake booster.

Figure 10:
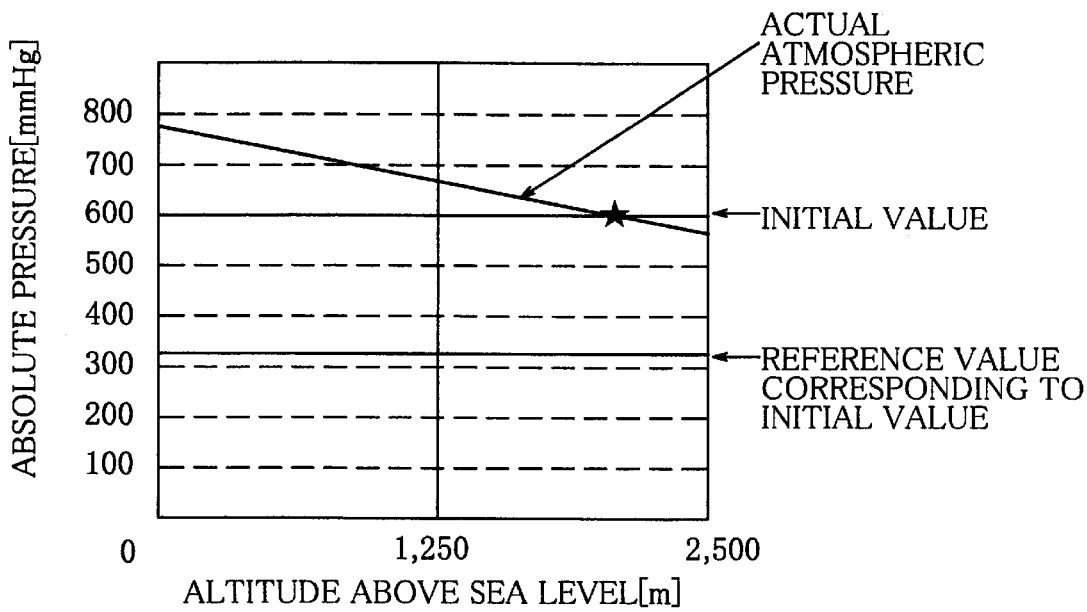
FIG. 10 is a diagram indicating a brake booster negative pressure determining reference value in a case where the initial value of a learned atmospheric pressure value is set to a value corresponding to a relatively high altitude above sea level

In that case, it is preferable that the initial value dedicated to the automatic stop-start control be set assuming a relatively high altitude above sea level (a location where the atmospheric pressure is relatively low) as indicated in FIG. 10.

The second embodiment described above is able to accurately evaluate the degree of negative pressure in the brake booster by using existing hardware constructions even in an internal combustion engine that is not equipped with an atmospheric pressure sensor, an intake pipe pressure sensor or the like.

In the above-described automatic stop-start apparatus for an internal combustion engine according to the invention, when it is determined whether sufficient negative pressure needed for the brake booster to boost the brake operating force is provided in the brake booster, the reference value used for the determination is corrected based on the atmospheric pressure occurring at the (current) location of the vehicle. Therefore, the degree of negative pressure in the brake booster can be accurately evaluated even in a situation where the atmospheric pressure fluctuates.

Therefore, when the actual degree of negative pressure in the brake booster decreases during the automatically stopped state of the engine, the automatic stop-start apparatus according to the invention is able to immediately start the internal combustion engine or advise a driving person to start the engine. As a result, the intake pipe negative pressure occurring in the intake passage of the engine is supplied to the brake booster, so that a sufficient negative pressure is reliably provided in the brake booster.

In the illustrated embodiment, the controller (ECU 22) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 3 and 5 can be used as the controller. A distributed processing architecture can be used for maximum data/signal processing capability and speed.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A control apparatus for an internal combustion engine installed in a vehicle equipped with a brake booster that boosts a brake operating force by using a negative pressure, the control apparatus comprising:
   a pressure detector that detects a pressure in the brake booster; and
   a controller that:
     (i) automatically stops the internal combustion engine when a predetermined stop condition is met, and automatically starts the internal combustion engine when a predetermined start condition is met;
     (ii) performs at least one of (a) output of a warning and (b) execution of an engine restart operation, when the pressure detected by the pressure detector exceeds a reference value while the internal combustion engine is automatically stopped; and
     (iii) changes the reference value in accordance with an atmospheric pressure, wherein the controller:
   estimates a first pressure value that corresponds to an atmospheric pressure around the vehicle;
   determines a second pressure value based on the estimated first pressure value; and
   changes the reference value based on the determined second pressure value.

2. An apparatus according to claim 1, further comprising a non-volatile memory, the second pressure value being stored into the non-volatile memory.

3. An apparatus according to claim 1, wherein the controller determines the second pressure value based upon an initial value that corresponds to an atmospheric pressure that normally occurs where an altitude above sea level is at least a predetermined value.

4. A control method for an internal combustion engine equipped with a brake booster that boosts a brake operating force by using a negative pressure, the control method comprising:
   detecting a pressure in the brake booster;
   automatically stopping the internal combustion engine when a predetermined stop condition is met;
   automatically starting the internal combustion engine when a predetermined start condition is met;
   performing at least one of (a) output of a warning and (b) executing an engine restart operation, when the pressure detected in the brake booster exceeds a reference value while the internal combustion engine is automatically stopped; and
   changing the reference value in accordance with an atmospheric pressure, further comprising:
     estimating a first pressure value that corresponds to an atmospheric pressure around the vehicle;
     determining a second pressure value based on the estimated first pressure value; and
     changing the reference value based on the determined second pressure value.

5. A method according to claim 4, further comprising storing the determined second pressure value into a non-volatile memory.

6. A method according to claim 4, wherein the determined second pressure value is determined by using an initial value that corresponds to an atmospheric pressure that normally occurs where an altitude above sea level is at least a predetermined value.

7. A vehicle comprising:
   an internal combustion engine;
   a brake booster that boosts a brake operating force by using a negative pressure;
   a pressure detector that detects a pressure in the brake booster; and
   a controller that:
     (i) automatically stops the internal combustion engine when a predetermined stop condition is met, and automatically starts the internal combustion engine when a predetermined start condition is met;
     (ii) performs at least one of (a) output of a warning and (b) execution of an engine restart operation, when the pressure detected by the pressure detector exceeds a reference value while the internal combustion engine is automatically stopped; and
     (iii) changes the reference value in accordance with an atmospheric pressure, wherein the controller:
   estimates a first pressure value that corresponds to an atmospheric pressure around the vehicle;
   determines a second pressure value based on the estimated first pressure value; and
   changes the reference value based on the determined second pressure value.

8. A vehicle according to claim 7, further comprising a non-volatile memory, the second pressure value being stored into the non-volatile memory.

9. A vehicle according to claim 7, wherein the controller determines the second pressure value based upon an initial value that corresponds to an atmospheric pressure that normally occurs where an altitude above sea level is at least a predetermined value.

* * * * *